United States Patent
Ozaki

[15] 3,693,469
[45] Sept. 26, 1972

[54] BICYCLE GEAR SHIFT LEVER
[72] Inventor: Nobuo Ozaki, Osaka, Japan
[73] Assignee: Maeda Industries, Ltd., Osaka, Japan
[22] Filed: Feb. 8, 1971
[21] Appl. No.: 113,287

[30] Foreign Application Priority Data
Nov. 26, 1970    Japan ............... 45/113350

[52] U.S. Cl. .................................. 74/489, 74/531
[51] Int. Cl. ....................................... G05g 5/18
[58] Field of Search .................. 74/488, 489, 531

[56] References Cited
UNITED STATES PATENTS
3,181,390   5/1965   Juy ........................... 74/531
3,315,959   4/1967   Carnielli ............... 74/531 X FOREIGN PATENTS OR APPLICATIONS
500,985   2/1939   Great Britain ............ 74/489

Primary Examiner—Milton Kaufman
Attorney—Ernest G. Montague

[57] ABSTRACT

A rotatable ratchet means is provided within a ring portion of a lever handle in a bicycle gear shift lever apparatus. By tightening an adjusting screw bolt, the ratchet means can be frictionally locked between a washer and a flange portion of a ratchet supporting shaft, whereby the lever handle can be operated smoothly and easily at least in one direction.

4 Claims, 6 Drawing Figures

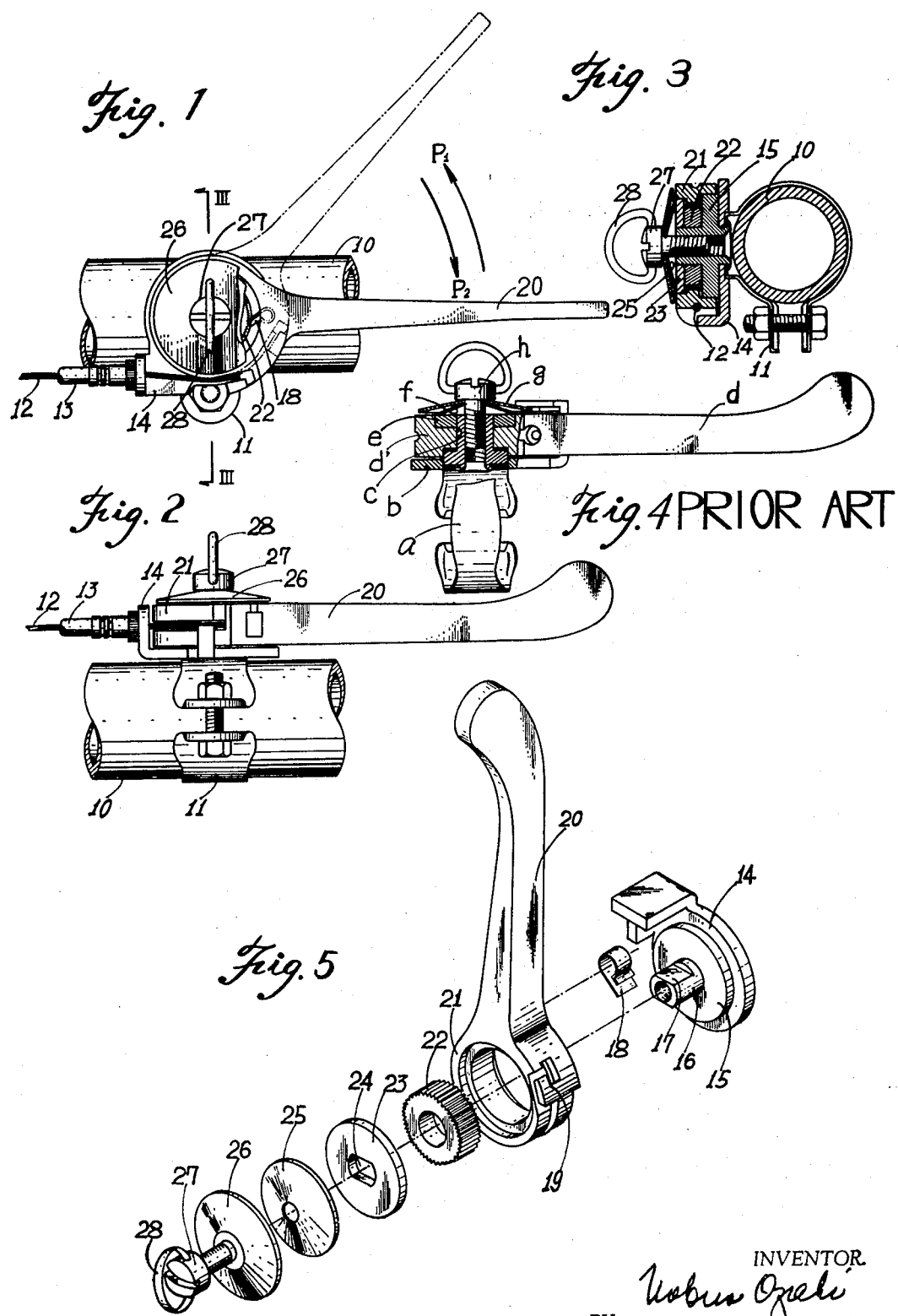

BICYCLE GEAR SHIFT LEVER

The present invention relates to a bicycle gear shift lever apparatus, in general, and to a bicycle gear shift lever apparatus by which a chain, which is driven by pedaling the bicycle, can be switched to another chain gear having different diameters so as to change the speed of the bicycle, in particular.

It is one object of the present invention to provide a bicycle gear shift lever which avoids the above-mentioned disadvantages. It is another object of the present invention to provide a bicycle gear shift lever, which employs a ratchet means interposed between a washer and a flange portion of the lever handle supporting shaft, whereby at least one way speed change operation can be effected very smoothly and easily.

It is still another object of the present invention to provide a bicycle gear shift lever apparatus which is capable of a smooth and easy operation at least in one direction.

It is yet another object of the present invention to provide a bicycle gear shift lever apparatus which comprises a ratchet means.

With these and other objects in view, which will become apparent in the following detailed description, the present invention will be clearly understood in connection with the accompanying drawings, in which:

FIG. 1 is a front elevation of the gear shift lever apparatus in the condition where assembled with a bicycle frame, with a part broken away, demonstrating the operation manner in phantom lines;

FIG. 2 is a bottom plan view of the gear shift lever apparatus of FIG. 1;

FIG. 3 is a sectional view along the line III—III of FIG. 1;

FIG. 4 shows one example of a conventional gear shift lever apparatus;

FIG. 5 is an exploded perspective view, showing each element of the gear shift lever apparatus in accordance with the present invention.

Figure 6:
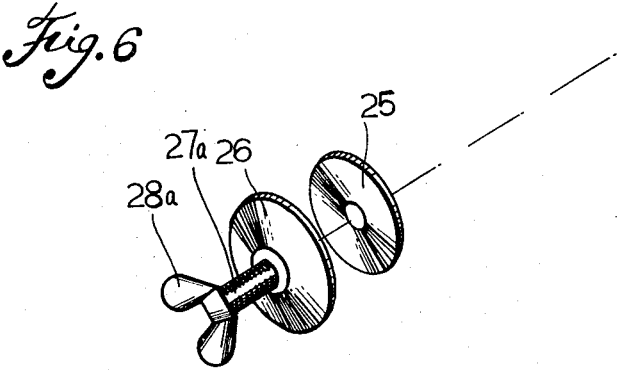
FIG. 6 is a perspective view of a modified adjusting screw bolt.

In conventional bicycle gear shift lever apparatuses, the pivotal lever handle is adapted to be adjustably locked in a selected position by a frictional force, which is greater than a spring return force or tensile force of a disconnecting gear unit. More particularly, as shown in FIG. 4, most of such prior art gear shift lever apparatuses comprise a binding fixture a with which the gear shift lever apparatus can be fixed at a suitable position on a bicycle frame, a base b to which a tubular housing for receiving a gear shift cable is to be fixed, a lever handle supporting shaft c having axially threaded therein, a lever handle d, a washer e, a washer pressing member f, a cover plate g, and an adjusting screw h inserted into the threaded hole of the lever handle supporting shaft. Therefore, the integral ring portion d' of the lever handle d is frictionally locked in a position when the washer e is pressed by the washer pressing member f as the adjusting screw is tightened. If such a frictional force is smaller than a spring return force or tensile force of the disconnecting gear unit, the lever handle cannot be frictionally locked in a selected position. Therefore, the adjusting screw must be tightened so that a sufficient frictional force, which must be greater than the tensile force of the disconnecting gear unit, can be developed between the washer e and the integral ring portion d' of the lever handle.

Consequently, in a speed change operation, a force is required which is at least greater than a combined force of the tensile force of the disconnecting gear unit and the frictional force great enough to lock the lever handle in a desired position. It is clear that such a combined force cannot be so small as to facilitate a smooth and easy swinging of the lever handle.

Referring now to the drawings, and more particularly to FIGS. 1–3 and 5, the gear shift lever apparatus according to the present invention is applied to a practical use as fixed to some suitable location of a bicycle frame 10 with a binding fixture 11, and comprises a base 14 to which a tubular cable housing 13 is fixedly connected, a gear shift cable 12 passing through the tubular cable housing 13. A gear shift cable 12 extending out of its tubular housing 13 is fixedly connected to an integral ring portion 21 of a lever handle 20 by means of a small fixing lug 19, so that the gear shift cable 12 may be pulled up or pushed down simultaneously as the lever handle 20 is pivotally moved.

Upon a flange portion 15 next to the base 14 is provided an inward shaft 16 being axially threaded therein and serving as a ratchet roller supporting shaft. About the shaft 16 is rotatably mounted a ratchet roller 22, which is disposed inside of the integral ring portion 21 of the lever handle 20. To one inner peripheral wall of the integral ring portion 21 of the lever handle 20 is operatively secured a claw 18 which is adapted to be engageable with the ratchet roller 22. Adjacent the free end of the shaft 16, there are formed two substantially flat opposite parallel sides 17. This free end of the shaft 16 is inserted into a correspondingly shaped opening 24 of a thick washer 23 for preventing the relative rotation therebetween. The washer 23 is arranged so as to be depressed by a conical ring plate 25 when a screw bolt 27, which is screwed into the threaded hole of the shaft 16, is tightened. In order to permit the manual operation of the screw bolt 27, it is required to provide a ring knob 28 with a head of the screw 27. Otherwise, a thumbscrew 27a, 28a, shown in FIG. 6 may be employed instead. A cover plate 26 can be provided adjacent the conical ring plate 25, which cover plate 26 can be omitted, however.

In use, the screw bolt 27 must be tightened in such manner, that the conical ring plate 25 can effectively depress the thick washer 23 so that such frictional forces as are at least greater than a total value of a tensile force of the disconnecting gear unit (not shown in the drawing) and a frictional force sufficient to prevent the ratchet roller 22 from an unexpected rotation, can be developed between the inner surface of the flange portion 15 and the opposite surface of the ratchet roller 22 as well as between the inner surface of the washer 23 and the opposite surface of the ratchet roller 22, respectively.

Thus, in operation, when the lever handle 20 is pivoted in the counterclockwise direction of the arrow $P_1$ in FIG. 1, the required force is only nearly equal to what is slightly greater than the tensile force of the disconnecting gear unit (supposing the frictional resistances that will occur when shifting the gear shift cable 12 as well as the claw 18 engaging with the ratchet 22 may be left out of account because neither of them are important factors in this case). In this operation, the ratchet roller 22 need not be rotated at all. Thus, a very smooth and easy operation of the lever handle 20 can be attained by a constant force.

In contrast thereto, it will be easily understood that, in the conventional gear shift apparatus as above-mentioned, the force required in the same operation must be at least twice greater than the tensile force of the disconnecting gear unit.

On the other hand, when the lever handle 20 is pivoted in the clockwise direction of the arrow $P_2$ in FIG. 1, the required force must be greater than those combined of the tensile force of the disconnecting gear unit and the frictional forces developed both between the inner surface of the flange portion 15 and the opposite surface of the ratchet roller 22, as well as between the inner surface of the washer 23 and the opposite surface of the ratchet roller 22, when the screw bolt 27 is tightened, because, in this operation, the ratchet roller 22 must be simultaneously rotated clockwise by means of the claw 18 for effecting a desired speed change. Therefore, as far as this operation is concerned, there is no improvement in the present invention.

It should be noted that the present invention illustrated and described in detail in the drawing and the foregoing description, is to be considered as illustrative, and that all changes and modifications that come within the spirit of the present invention are included.

While I have disclosed one embodiment of the present invention, it is to be understood that this embodiment is given by example only and not in a limiting sense.

I claim:
1. A bicycle gear shift lever apparatus, comprising
a base,
a tubular housing connected to said base,
a gear shift cable received in said tubular housing,
a shaft disposed adjacent said base and having an inner thread,
an adjusting screw bolt having a complementary thread and received by said shaft,
a pivotal lever handle including an integral ring portion having an inner wall,
a cylindrical ratchet means received by said ring portion,
said ring portion being rotatably mounted about said ratchet means,
a gear shift cable fixing means provided on the outer surface of said ring portion of said lever handle, in order to shift said gear shift cable simultaneously upon pivoting said lever handle,
said cylindrical ratchet means being rotatably mounted on said shaft,
a claw operatively secured to said inner wall of said ring portion of said lever handle and engageable with said ratchet means,
a washer having an opening substantially in its center portion, said opening having a cross section complementary to that of the free end of said shaft,
a washer pressing member disposed adjacent said washer, to exert pressure on said washer and to prevent relative rotation between said washer and said ratchet means, and
said adjusting screw bolt being screwed into said inner thread of said shaft for frictionally locking said ratchet means in a selected position.

2. The apparatus, as set forth in claim 1, which includes
a ring knob secured to a head of said adjusting screw bolt for easier manual operation.

3. The apparatus, as set forth in claim 1, wherein said adjusting screw bolt comprises a thumb screw.

4. The apparatus, as set forth in claim 1, wherein said washer pressing member comprises a conical ring plate.

* * * * *

UNITED STATES PATENT OFFICE
CERTIFICATE OF CORRECTION

Patent No. 3,693,469      Dated September 26, 1972

Inventor(s) Nobuo Ozaki

It is certified that error appears in the above-identified patent and that said Letters Patent are hereby corrected as shown below:

On the cover sheet [30] "Nov. 26, 1970" should read -- Nov. 13, 1970 --.

Signed and sealed this 1st day of May 1973.

(SEAL)
Attest:

EDWARD M. FLETCHER, JR.       ROBERT GOTTSCHALK
Attesting Officer      Commissioner of Patents